(12) United States Patent
Liao

(10) Patent No.: US 11,048,907 B2
(45) Date of Patent: Jun. 29, 2021

(54) OBJECT TRACKING METHOD AND OBJECT TRACKING SYSTEM

(71) Applicant: PixArt Imaging Inc., Hsin-Chu (TW)

(72) Inventor: Chi-Chieh Liao, Hsin-Chu (TW)

(73) Assignee: Pix Art Imaging Inc., Hsin-Chu (TW)

(*) Notice: Subject to any disclaimer, the term of this patent is extended or adjusted under 35 U.S.C. 154(b) by 9 days.

(21) Appl. No.: 15/712,161

(22) Filed: Sep. 22, 2017

(65) Prior Publication Data

US 2019/0095689 A1 Mar. 28, 2019

(51) Int. Cl.
*G06K 9/00* (2006.01)

(52) U.S. Cl.
CPC ....... *G06K 9/00087* (2013.01); *G06K 9/0002* (2013.01)

(58) Field of Classification Search
CPC ............. G06K 9/00087; G06K 9/0002
See application file for complete search history.

(56) References Cited

U.S. PATENT DOCUMENTS

| | | | |
|---|---|---|---|
| 9,367,173 B2 | 6/2016 | Setlak | |
| 9,494,995 B2* | 11/2016 | Kitchens, II | G01S 7/52085 |
| 9,570,002 B2 | 2/2017 | Sakariya | |
| 9,589,171 B1* | 3/2017 | Larsson | G06K 9/0002 |
| 10,101,885 B1* | 10/2018 | Dand | G06F 3/1454 |
| 10,232,680 B2* | 3/2019 | Park | B60H 1/00849 |
| 10,546,178 B2* | 1/2020 | Roh | G06K 9/00087 |
| 2008/0228374 A1* | 9/2008 | Ishizuka | F02D 41/3809 701/103 |
| 2009/0150994 A1* | 6/2009 | Evans | G07F 7/1008 726/20 |
| 2011/0080350 A1* | 4/2011 | Almalki | G06F 3/0416 345/173 |
| 2012/0013556 A1* | 1/2012 | Chen | G06F 3/017 345/173 |
| 2012/0063644 A1* | 3/2012 | Popovic | A61B 34/20 382/103 |
| 2014/0232525 A1* | 8/2014 | Mohmedi | G07C 9/257 340/5.83 |
| 2015/0015700 A1* | 1/2015 | Becker | G01B 11/14 348/136 |
| 2015/0070301 A1* | 3/2015 | Chia | G06K 9/0002 345/174 |
| 2016/0077667 A1* | 3/2016 | Chiang | G06F 3/0418 345/173 |
| 2016/0238466 A1* | 8/2016 | Tanimoto | G01L 1/16 |

(Continued)

*Primary Examiner* — Mia M Thomas
(74) *Attorney, Agent, or Firm* — Winston Hsu

(57) ABSTRACT

An object tracking method applied to an object tracking system comprising an object sensing device, an object identifying device, and a control interface comprising an object sensing region and an object identifying region. The object tracking method comprises: (a) generating object sensing values via the object sensing device; (b) calculating a location for the object on the object sensing region according to the object sensing values; and (c) adjusting the location for the object if the object sensing device or the object identifying device determines at least part of the object is on the object identifying region. The step (c) can adjust the location for the object if the object will enter the object identifying region. By this way, the dead zone issue for the control interface can be avoided.

5 Claims, 7 Drawing Sheets

(56) References Cited

U.S. PATENT DOCUMENTS

| | | | |
|---|---|---|---|
| 2016/0253041 A1* | 9/2016 | Park | G06F 3/0418 |
| | | | 345/174 |
| 2016/0364591 A1* | 12/2016 | El-Khoury | G06F 3/04883 |
| 2017/0131841 A1* | 5/2017 | Chang | G06F 3/0418 |
| 2017/0308732 A1* | 10/2017 | Wang | G06K 9/00087 |
| 2018/0114047 A1* | 4/2018 | Kim | G06F 3/0412 |
| 2018/0329538 A1* | 11/2018 | Hu | G06K 9/0002 |
| 2019/0005292 A1* | 1/2019 | Pi | G06F 1/1626 |
| 2019/0095077 A1* | 3/2019 | Mori | H04W 12/06 |
| 2019/0102598 A1* | 4/2019 | Jiang | G06K 9/0008 |
| 2019/0251317 A1* | 8/2019 | Jiang | G06F 21/81 |
| 2019/0251329 A1* | 8/2019 | Jiang | G06F 21/81 |
| 2019/0325185 A1* | 10/2019 | Tang | G10K 9/125 |
| 2020/0004413 A1* | 1/2020 | Shen | G06F 3/04883 |

* cited by examiner

OBJECT TRACKING METHOD AND OBJECT TRACKING SYSTEM

BACKGROUND OF THE INVENTION

1. Field of the Invention

The present invention relates to an object tracking method and an object tracking system, and particularly relates to an object tracking method and an object tracking system that can compensate the object location while the object is on an object identifying region or will enter the object identifying region.

2. Description of the Prior Art

In order to improve the safety for an electronic apparatus, a fingerprint identifying device is always provided in the electronic apparatus. For such electronic apparatus, if a user needs to control the electronic apparatus to perform some specific operations (ex. unlock the electronic apparatus or transfer money), his fingerprint must be checked by the fingerprint identifying device to determine if he can execute such specific operation. In some cases, the fingerprint identifying device is provided in a touch pad.

FIG. 1 is a schematic diagram illustrating a conventional touch pad with a fingerprint identifying region. As illustrated in FIG. 1, the touch pad 100 comprises a touch sensing region 101 and a fingerprint identifying region 103. The touch sensing region 101 is employed to generate touch sensing values to determine a location or a track for a finger thereon. Additionally, the fingerprint identifying region 103 is employed to identify the fingerprint of a user. However, the fingerprint identifying region 103 always has no touching sensing function or weak touch sensing function. Accordingly, the location or the track for the finger cannot be accurately calculated while the finger is on or passes through the fingerprint identifying region 103. Therefore, a dead zone for object tracking exists on the touch pad if the touch pad has a fingerprint identifying region, such that a size and a location of the fingerprint identifying region is limited.

SUMMARY OF THE INVENTION

Therefore, one objective of the present invention is to provide an object tracking method that can avoid the interruption for finger tracking even if the finger is on the fingerprint identifying region.

One embodiment of the present invention provides an object tracking method applied to an object tracking system comprising an object sensing device, an object identifying device, and a control interface comprising an object sensing region and an object identifying region. The object tracking method comprises: (a) generating object sensing values via the object sensing device; (b) calculating a location for the object on the object sensing region according to the object sensing values; and (c) adjusting the location for the object if the object sensing device or the object identifying device determines at least part of the object is on the object identifying region.

One embodiment of the present invention provides an object tracking method applied to an object tracking system comprising an object sensing device, an object identifying device, and a control interface comprising an object sensing region and an object identifying region. The object tracking method comprises: (a) generating object sensing values via the object sensing device; (b) calculating a location for the object on the object sensing region according to the object sensing values; and (c) adjusting the location for the object if the object sensing device determines at least part of the object will enter the object identifying region.

Another embodiment of the present invention provides an object tracking system comprising: a control interface, comprising an object sensing region and an object identifying region; an object sensing device, configured to generate object sensing values and to calculate a location for the object on the object sensing region according to the object sensing values; and an object identifying device. The object sensing device adjusts the location for the object if the object sensing device or the object identifying device determines at least part of the object is on the object identifying region.

Another embodiment of the present invention provides an object tracking system comprising: a control interface, comprising an object sensing region and an object identifying region; an object sensing device, configured to generate object sensing values and to calculate a location for the object on the object sensing region according to the object sensing values; and an object identifying device. The object sensing device adjusts the location for the object if the object sensing device determines at least part of the object will enter the object identifying region.

In view of above-mentioned embodiments, the object tracking can be compensated while the object is on the object identifying region. By this way, the conventional dead zone issue can be solved and the object identifying region can have a larger size and can be provided to any location of the control interface.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present application. Please note, in these embodiments, the component such as a device, a module, a system or an apparatus, can be implemented by hardware (ex. a circuit), or hardware with software (ex. a processor with at least one program).

Figure 1:
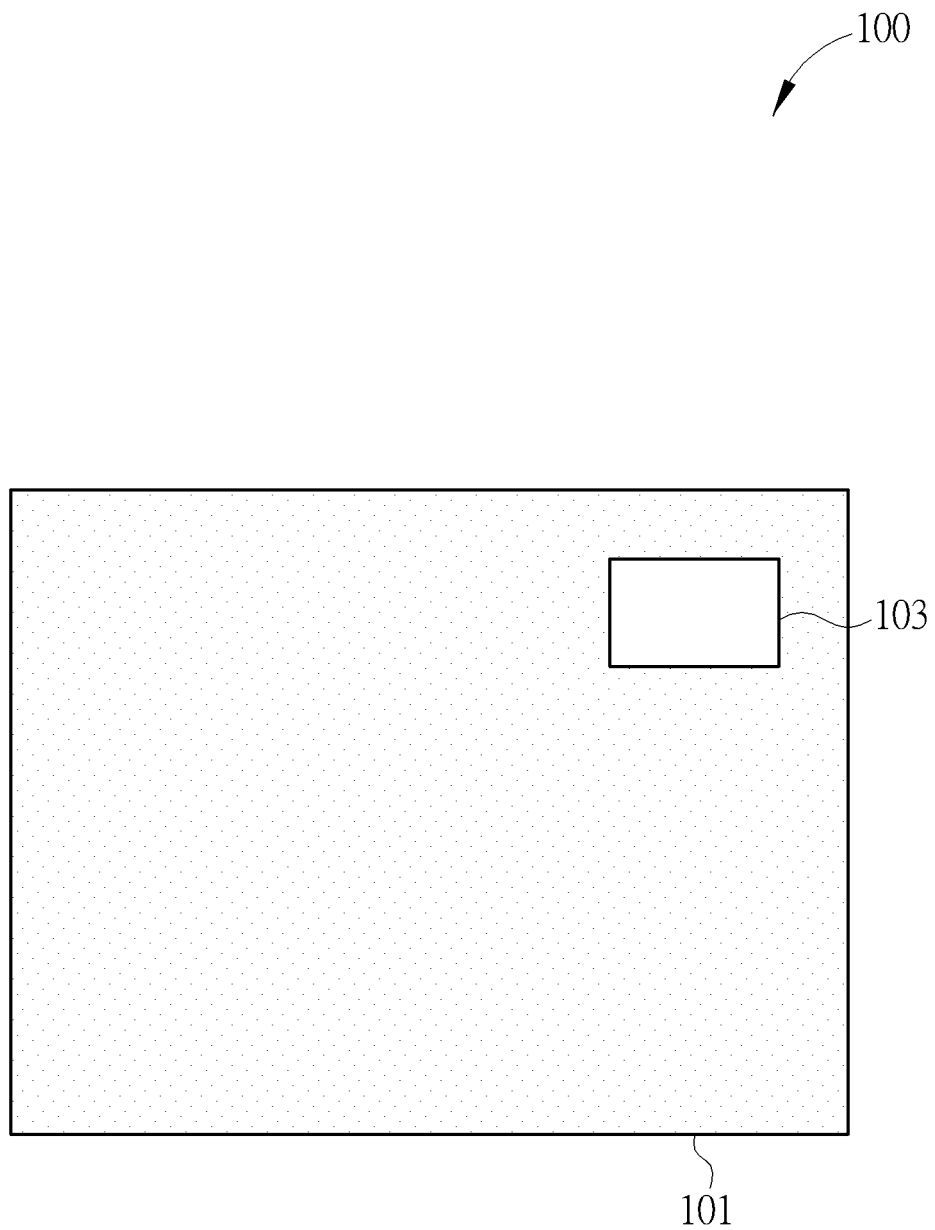
FIG. 1 is a schematic diagram illustrating a conventional touch pad with a fingerprint identifying device.
Figure 2:
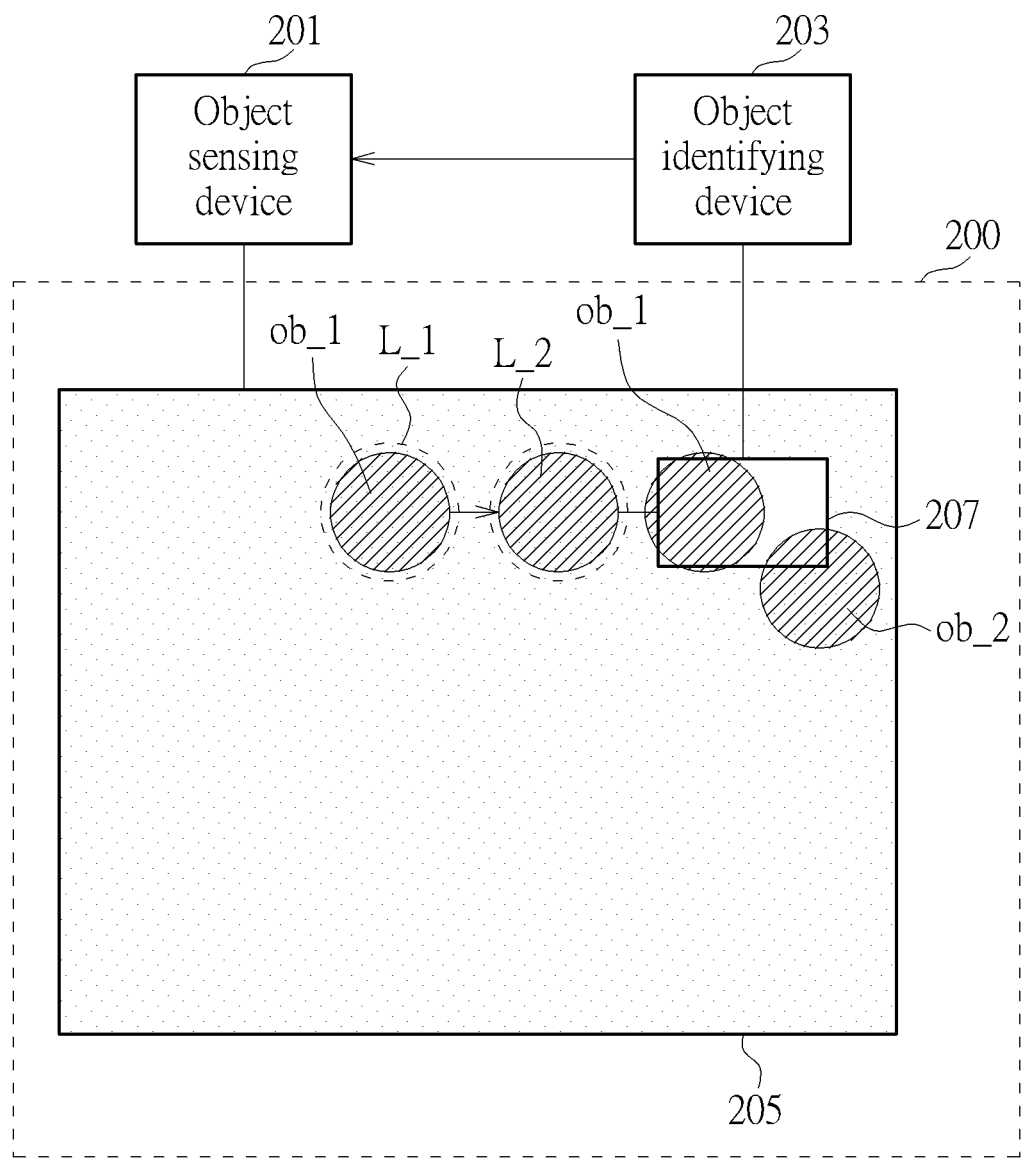
FIG. 2-FIG. 5 are schematic diagrams illustrating object tracking systems according to different embodiments of the present application.

FIG. 2-FIG. 5 are schematic diagrams illustrating object tracking systems according to different embodiments of the present application. As illustrated in FIG. 2, an object tracking system provided by one embodiment of the present application comprises a control interface 200, an object sensing device 201, and an object identifying device 203. The object sensing device 201 and the object identifying device 203 can be integrated to the control interface 200, but can be independent form the control interface 200 as well. The control interface 200 comprises an object sensing region 205 coupled to the object sensing device 201, and comprises an object identifying region 207 coupled to the object identifying device 203. The object tracking system may be any kind of electronic apparatus, such as a mobile phone, a notebook, or a tablet computer. Further, the control interface 200 may be any type of control interface, such as a capacitive or optical touch screen, or a touch pad.

In one embodiment, the object is a finger. In such embodiment, the object sensing device 201 is a touch sensing device and the object identifying device 203 is a fingerprint identifying device. Correspondingly, in such embodiment, the object sensing region 205 is a touch sensing region and the object identifying region 207 is a fingerprint identifying region. However, it does not mean the present invention is limited to these examples. For example, in one embodiment, the object is a control accessory such as a stylus, and the object identifying device 203 is a device which can identify information (ex. user information) recorded in the stylus. Such variation should also fall in the scope of the present invention.

In the embodiment of FIG. 2, the object sensing device 201 is configured to generate object sensing values and to calculate a location for the object on the object sensing region 205 according to the object sensing values. For example, if the object sensing region 205 is a capacitive touch sensing region, the object sensing values are touch sensing values such as capacitance values. In such example, the object sensing region 205 can calculate a location for the object based on the variation for capacitance values.

Moreover, in the embodiment of FIG. 2, the object identifying region 207 has no object sensing function. Accordingly, if the object identifying device 203 detects at least part of the object is on the object identifying region 207, the object identifying device 203 informs the object sensing device 201 such information, and the object sensing device 201 sets the location for the object according to at least one compensating value. For example, full part of the object ob_1 is on the object identifying region 207 thus the object identifying device 203 informs the object sensing device 201 that the object ob_1 is on the object identifying region 207, and the object sensing device 201 sets the location for the object ob_1 according to at least one compensating value. For another example, a part of the object ob_2 is on the object identifying region 207, thus the object identifying device 203 also informs the object sensing device 201 that the object ob_2 is on the object identifying region 207, and the object sensing device 201 sets the location for the object ob_2 according to at least one compensating value and/or sensing values from the object sensing region 205. In one embodiment, the object sensing device 201 sets the location for the object ob_2 directly to the at least one compensating value. In another embodiment, the object sensing device 201 sets the location for the object ob_2 referring both the location for the part of object ob_2 which is on the object sensing region 205 and the compensating value.

Please note, in one embodiment, the object identifying device 203 cannot determine if only part or all of the object is on the object identifying region 207, thus the object identifying device 203 informs the object sensing device 201 that the object is on the object identifying region 207 once any part of the object is on the object identifying region 207.

The compensating value can be pre-recorded in a storage device, or be generated by the object sensing device 201 or the object identifying device 203. Also, the compensating value can be generated by any other device coupled to the object sensing region 205 or the object identifying region 207

In one embodiment, the object identifying device 203 generates the compensating value based on the signal intensity thereof. For example, if the object identifying device 203 is a fingerprint identifying device, the object identifying device 203 generates a stronger (ex. larger) compensating value if the fingerprint detected by the object identifying device 203 is obvious. One of the reasons is, if the signal intensity of the object identifying device 203 is stronger, it can be sure that the object is on the object identifying region 207, thus the object identifying device 203 can make a stronger compensating value to adjust the location of the object to be on the object identifying region 207.

In one embodiment, the at least one compensating value is at least one predetermined value indicating the location for the object on the object identifying region 207. Take the object ob_1 for example, the object sensing device 201 could not detect the location of the object ob_1, but sets the location for the object to at least one value which indicate the object ob_1 is on the object identifying region 207 based on the compensating value, while at least part of the object ob_1 is on the object identifying region 207. Such predetermined value can be changed corresponding to different sizes or different locations for the object identifying region 207. By this way, the track for the object will not be interrupted even if the object moves on the object identifying region 207.

The above-mentioned compensating value can be any predetermined value rather than limited to the predetermined value indicating the location for the object on the object identifying region 207. In one embodiment, the compensating value is calculated according to a track of the object. Please refer to FIG. 2 again, the object sensing device 201 detects the object ob_1 moves from the location L_1 to the location L_2 in a time period, thus the object sensing device 201 can accordingly calculate the moving speed and the moving direction of the object ob_1. Therefore, the object sensing device 201 can calculate the compensating value, which indicates a possible location for the object ob_1 after a predetermined time period, according to the moving speed and the moving direction of the object ob_1.

In one embodiment, the object sensing device 201 or the object identifying device 203 calculates the compensating value according the track from the location L_1 to the location L_2 if the object identifying device 203 informs that the object is on the object identifying region 207. Also, in another embodiment, the object sensing device 201 calculates the compensating value based on the track of the object and a value provided by the object identifying device 203 (ex. signal intensity of the object identifying device 203).

In one embodiment, the object sensing device 201 sets the location for the object according to a compensating value if the object sensing device 201 determines at least part of the object will enter the object identifying region 207. Please refer to FIG. 3, similar with the control interface 200 in FIG. 2, the control interface 300 also comprises an object sensing region 205 coupled to the object sensing device 201, and comprises an object identifying region 207 coupled to the object identifying device 203. Also, in the embodiment of FIG. 3, the object identifying region 207 still has no object sensing function. Other details for the object sensing device 201, the object identifying device 203, the object sensing region 205 and the object identifying region 207 are illustrated in above-mentioned embodiments, thus are omitted for brevity here.

Figure 3:
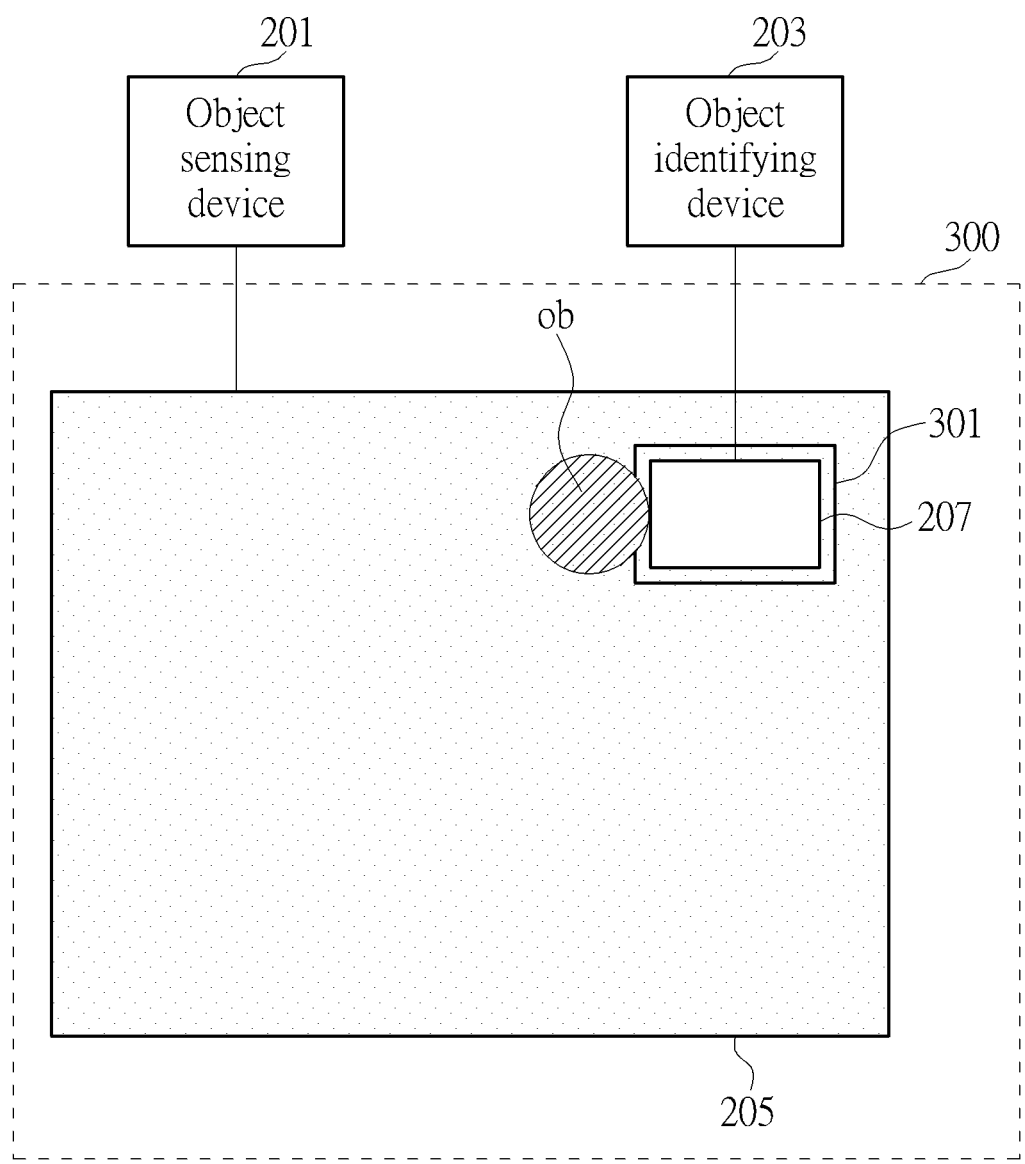

In the embodiment of FIG. 3, the object sensing device 201 determines at least part of the object will enter the object identifying region 207 if the object ob touches an edge region 301 of the object sensing region 205. The object sensing device 201 can detect that the object ob touches the edge region 301 and does not need informing from the object identifying device 203, since the edge region 301 belongs to the object sensing region 205.

Once the object ob enters the edge region 301, the object sensing device 201 determines that the object will enter the object identifying region 207 since the edge region 301 is adjacent to the object identifying region 207, and then sets the location for the object according to at least one compensating value. Please note, the shape and the location of the edge region 301 is not limited to the embodiment illustrated in FIG. 3. That is, the edge region 301 can be replaced by a specific region at any location and with any shape. Other details for the embodiment illustrated in FIG. 2 can be employed to the embodiment of FIG. 3, for example, the compensating value can be a predetermined value or a value determined by a track of the object.

In one embodiment, the object identifying device 203 is activated based on if the object is close to the object identifying region 207. For example, if the object sensing device 201 determines that the object will reach the object identifying region 207 after moves for a predetermined distance based on the speed of the object, the object identifying device 203 is activated. On the opposite, if the object sensing device 201 determines that the object will not reach the object identifying region 207 after moves for the predetermined distance based on the speed of the object, the object identifying device 203 is not activated. The object identifying device 203 by any other device, for example, a processor applied to control the object identifying device 203.

The object sensing device 201 can determine if at least part of the object will enter the object identifying region 207 based on other references. Please refer to FIG. 4, in this embodiment, the object sensing device 201 determines if at least part of the object ob_1 will enter the object identifying region 207 based on a track for the object ob_1 on the object sensing region 205. For more detail, the object sensing device 201 detects the object ob_1 moves from the location L_1 to the location L_2 in a time period, thus the object sensing device 201 can accordingly acquire the moving speed and the moving direction of the object ob_1. Therefore, the object sensing device 201 can calculate a possible location for the object ob_1 after a predetermined time period, according to the moving speed and the moving direction of the object ob_1. By this way, the object sensing device 201 can determine if at least part of the object will enter the object identifying region 207 based on the track of the object ob_1.

In above-mentioned embodiments, the object identifying region has no object sensing function. However, in some embodiments, the object identifying region can have weak object sensing function. The object sensing device can detect a rough location of the object via such weak object sensing function. However, the location is not accurate enough, thus needs be compensated.

Figure 5:
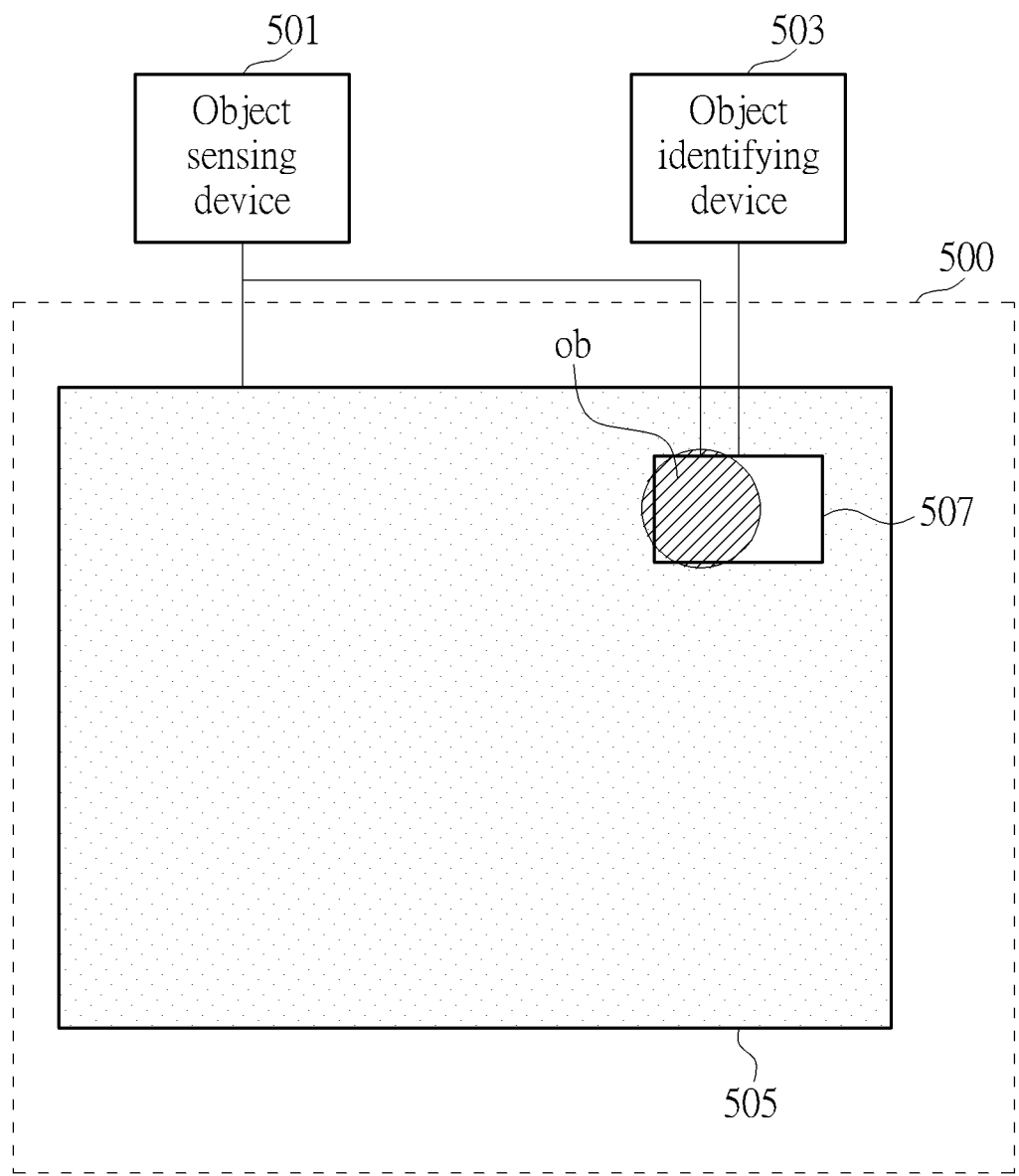

Please refer to FIG. 5, an object tracking system provided by one embodiment of the present application comprises a control interface 500, an object sensing device 501, and an object identifying device 503. The object sensing device 501 and the object identifying device 503 can be integrated to the control interface 500, but can be independent form the control interface 500 as well. The control interface 500 comprises an object sensing region 505 coupled to the object sensing device 501, and comprises an object identifying region 507 coupled to the object identifying device 503.

Besides the object identifying function, the object identifying region 507 further has some object sensing function. Accordingly, the object sensing device 501 can detect the object ob is on the object identifying region 507 and needs no informing from the object identifying device 503. After determining the object ob is on the object identifying region 507, the object sensing device 501 sets the location for the object ob according to at least one compensating value. As above-mentioned, the compensating value can be a predetermined value or a value determined by a track of the object. Other details for the object sensing device 501, the object identifying device 503, and the object sensing region 505 are illustrated in above-mentioned embodiments, thus are omitted for brevity here.

It will be appreciated that the detail structures for the object identifying region 507 having object sensing function are well known by persons skilled in the art. For example, the US patent with a patent number U.S. Pat. No. 9,367,173 and the US patent with a patent number U.S. Pat. No. 9,570,002 disclose such structures.

Figure 6:
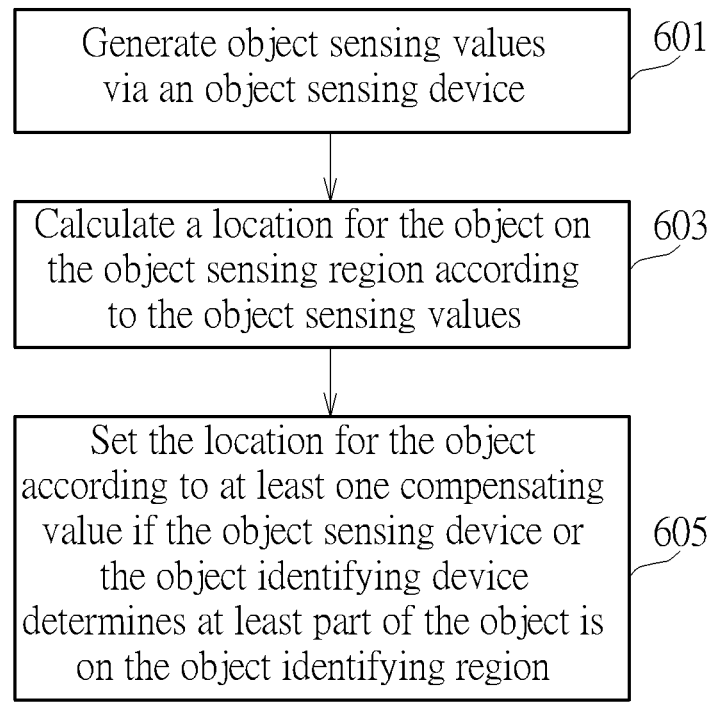
FIG. 6 and FIG. 7 are object tracking methods according to different embodiments of the present application.

Based on above-mentioned embodiments, an object tracking method illustrated in FIG. 6 can be acquired, which comprises following steps:

Step 601

Generate object sensing values via an object sensing device (ex. 201 in FIG. 2).

Step 603

Calculate a location for the object on the object sensing region (ex. 205 in FIG. 2) according to the object sensing values.

Step 605

Adjust the location for the object if the object sensing device or the object identifying device determines at least part of the object is on the object identifying region (ex. the embodiments of FIG. 2 and FIG. 5).

Figure 7:
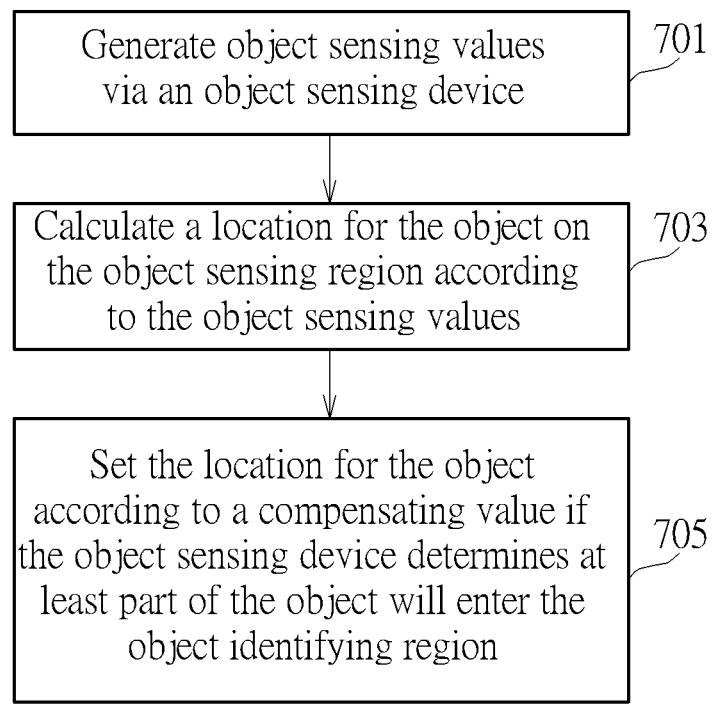

Additionally, based on above-mentioned embodiments, an object tracking method illustrated in FIG. 7 can be acquired, which comprises following steps:

Step 701

Generate object sensing values via an object sensing device (ex. 201 in FIG. 2).

Step 703

Calculate a location for the object on the object sensing region (ex. 205 in FIG. 2) according to the object sensing values.

Step 705

Figure 4:
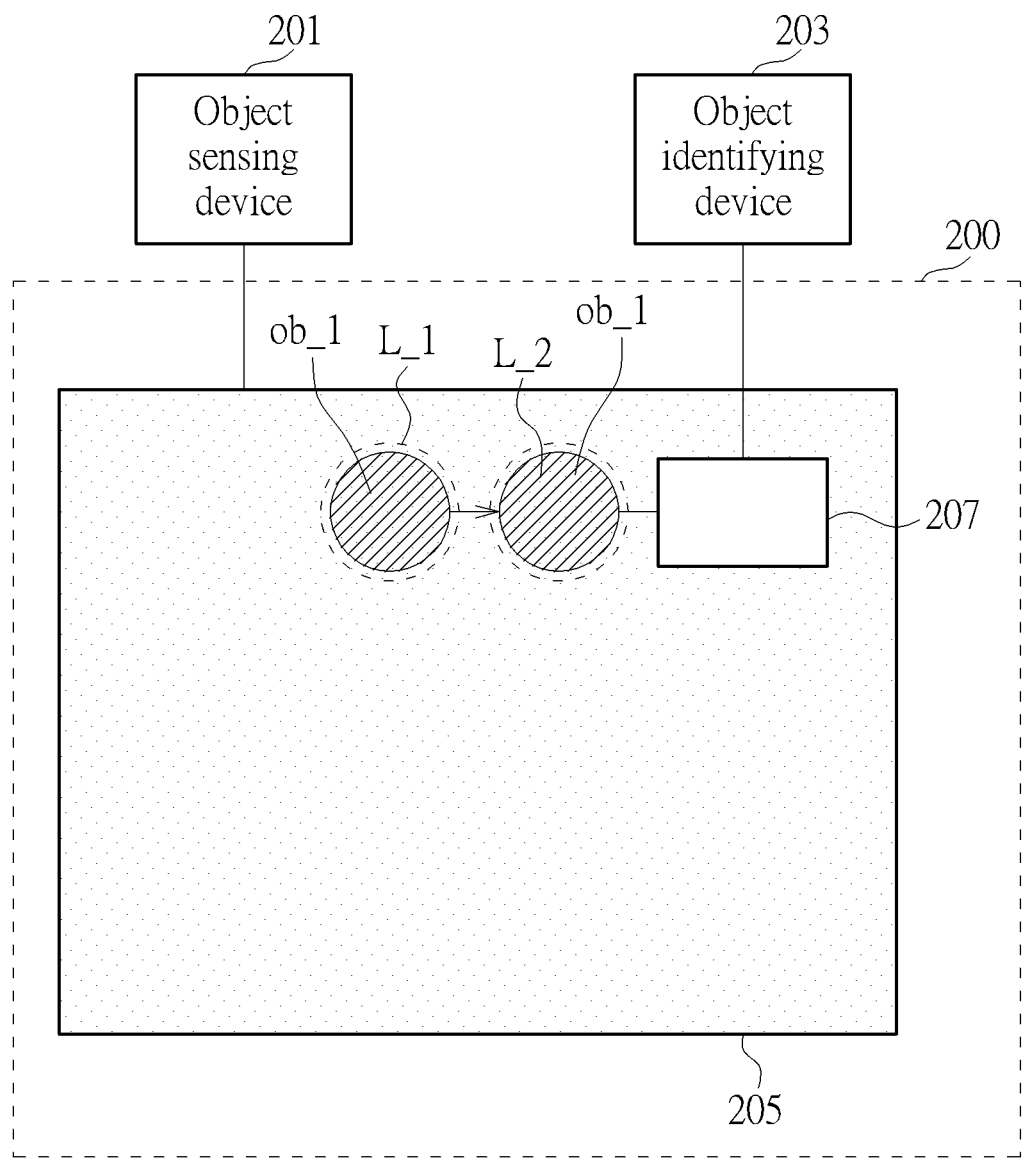

Adjust the location for the object if the object sensing device determines at least part of the object will enter the object identifying region (ex. the embodiments of FIG. 3 and FIG. 4).

Other details for the object tracking method can be acquired based on above-mentioned embodiments, thus descriptions thereof are omitted for brevity here.

In view of above-mentioned embodiments, the object tracking can be compensated while the object is on the object identifying region. By this way, the conventional dead zone issue can be solved and the object identifying region can have a larger size and can be provided to any location of the control interface.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object tracking method applied to an object tracking system comprising an object sensing device, an object identifying device and a control interface comprising an object sensing region and an object identifying region, comprising:
   (a) generating object sensing values via the object sensing device;
   (b) calculating a location for the object on the object sensing region according to the object sensing values, wherein the object sensing region is surrounding at least two sides of the object identifying region;
   wherein the object tracking method further comprises:
   (c) detecting if at least part of the object is on the object identifying region by the object identifying device; and
   (d) adjusting the location for the object according to the detecting in the step (c), when the object is moving on the object sensing region and at least part of the object is entering the object identifying region.

2. The object tracking method of claim 1, wherein the location for the object is adjusted by a compensating value, and the compensating value is a predetermined value.

3. The object tracking method of claim 1, wherein the location for the object is adjusted by a compensating value, and the compensating value is determined based on a track for the object on the object sensing region.

4. The object tracking method of claim 1, wherein the object sensing device is a touch sensing device, the object identifying device is a fingerprint identifying device, the object sensing region is a touch sensing region, and the object identifying region is a fingerprint identifying region.

5. An object tracking method applied to an object tracking system comprising an object sensing device, an object identifying device, and a control interface comprising an object sensing region and an object identifying region, comprising:
   (a) generating object sensing values via the object sensing device;
   (b) calculating a location for the object on the object sensing region according to the object sensing values, wherein the object sensing region is surrounding the object identifying region;
   (c) detecting if at least part of the object is on the object identifying region by the object identifying device; and
   (d) adjusting the location for the object according to the detecting in the step (d), when the object is moving on the object sensing region and at least part of the object is entering the object identifying region.

* * * * *